United States Patent Office 3,567,768
Patented Mar. 2, 1971

3,567,768
PROCESS FOR PREPARING AMINO
ALKYLENEPHOSPHONIC ACIDS
Chung Yu Shen and Steven J. Fitch, St. Louis, Mo., assignors to Monsanto Company, St. Louis, Mo.
No Drawing. Continuation of application Ser. No. 362,451, Apr. 24, 1964. This application Oct. 2, 1967, Ser. No. 672,393
Int. Cl. C07f 9/38
U.S. Cl. 260—502.5                  12 Claims

ABSTRACT OF THE DISCLOSURE

Processes for preparing amino alkylenephosphonic acids by reacting a nitrogenous material such as ammonia, an organic carbonyl compound such as formaldehyde and orthophosphorous acid in order to form such amino alkylene phosphonic acid, said reaction being carried out in the presence of a halide catalyst and the orthophosphorous acid is utilized 20% in excess of the stoichiometric amount required to react with the ammonia and formaldehyde.

---

The present invention is a continuation of Ser. No. 362,451, filed Apr. 24, 1964 and now abandoned.

This invention relates to an improved process for preparing amino alkylenephosphonic acids. More particularly, this invention relates to a process for preparing amino alkylenephosphonic acids in improved yields and/or improved purity.

There are disclosed in co-pending applications S.N. 152,048, filed Nov. 13, 1961 now U.S. Pat. 3,288,846, and S.N. 217,276, filed Aug. 16, 1962 now abandoned, novel processes for preparing amino alkylenephosphonic acids. The processes disclosed in the foregoing applications describe, in general, the overall reaction of a nitrogenous material, an organic carbonyl compound and orthophosphorous acid to prepare amino alkylenephosphonic acids. The yields of the amino alkylenephosphonic acid compounds prepared by the foregoing processes are oftentimes reduced because of the many possible side products which can be formed in addition to the desired compounds. In addition, it is oftentimes necessary to conduct the reaction for relatively long periods of time in order to prepare the desired compounds in relatively high yields. As can be appreciated, therefore, a process for improving the yields and/or purity of the desired amino alkylenephosphonic acid compounds as well as in some cases reducing the reaction time necessary for preparing the desired compounds would represent a significant advancement in this art.

Therefore, it is an object of this invention to provide an improved process for preparing amino alkylenephosphonic acid compounds.

It is a further object of this invention to provide a process for improving the yields of amino alkylenephosphonic acid compounds prepared by the reaction of a nitrogenous material, an organic carbonyl compound and orthophosphorous acid.

It is a further object of this invention to provide a process for improving the purity of amino alkylenephosphonic acid compounds prepared by the reaction of a nitrogenous material, an organic carbonyl compound and orthophosphorous acid.

It is a further object of this invention to provide a process for improving the yields of amino alkylenephosphonic acid compounds as well as reducing the reaction time necessary for preparing the desired compounds in the reaction of a nitrogenous material, an organic carbonyl compound and orthophosphorous acid.

It is a still further object of this invention to provide a process for improving the yields and purity of solid amino alkylenephosphonic acid compounds prepared by the reaction of a nitrogenous material, an organic carbonyl compound and orthophosphorous acid.

These and other objects will become more apparent from a reading of the following detailed description.

It has been found that amino alkylenephosphonic acid compounds can be prepared in improved yields and/or improved purity as well as in some cases reduced reaction times by reacting together, in any order, a nitrogenous material, an organic carbonyl compound, and orthophosphorous acid when the reaction is carried out in the presence of excess orthophosphorous acid as will be more fully discussed hereinafter.

The reaction for preparing an amino alkylenephosphonic acid compound, i.e., a compound containing at least one N—C—P bond, wherein the P is from the orthophosphorous acid, can be represented by the following overall equation:

(1) $\diagup\!\!\!\!\diagdown\!\!\text{N--H} + -\overset{\overset{\displaystyle O}{\|}}{\text{C}}- + \text{H}-\overset{\overset{\displaystyle O}{\|}}{\text{P}}-(\text{OH})_2 \longrightarrow$

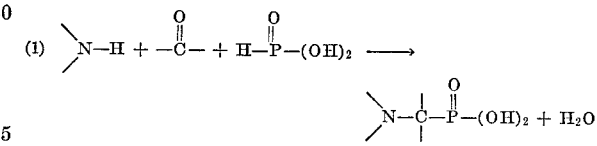

The reactant compounds which are suitable, as well as the resulting amino alkylenephosphonic acid compounds, are those which are disclosed and/or described in the foregoing applications and, in general, the foregoing overall reaction (1) can be accomplished by reacting together in any order under conditions specified hereinafter, the following:

(a) a reactive nitrogenous material (i.e., a nitrogen-containing or nitrogenous compound such as ammonia, a primary amine, or a secondary amine),
(b) an organic carbonyl compound (i.e., an aldehyde or ketone), and
(c) orthophosphorous acid.

In general, the overall reaction may be carried out in the conventional manner for this reaction, that is, in an acidic aqueous medium and preferably under elevated temperature as well as preferably carrying out the reaction in the presence of a catalyst as disclosed and/or described in the foregoing applications. Generally speaking, the use of an acidic aqueous medium having a pH below about 2 with the aqueous medium containing from about 30% to about 60% water by weight, elevated temperatures from about 85° C. to reflux temperatures, and a chloride catalyst present in amounts from about .3% to about 20% by weight are especially preferred process conditions.

Quite unexpectedly it was found that although substantially stoichiometric molar ratios of reactants, that is, molar ratios of reactants within about 10% by weight of stoichiometry, form the desired compounds in relatively high yields, use of orthophosphorous acid in excess amounts results in even better yields as well as improved purity and in some cases permits reduced reaction times for preparing the desired compounds. This improvement is not obtained by the use of the nitrogenous material and/or organic carbonyl compounds in excess amounts, in fact, the use of such in excess amounts results, in most cases, in reduced yields and the formation of many and varied side products. In addition, a further advantage in using the orthophosphorous acid in excess amounts is the ease of recovery of the desired compounds in solid form from an orthophosphorous acid solution. The compounds can be recovered from the acid solution by various methods, such as, removing the water by evaporation including vacuum evaporation, allowing the compounds to crystallize by cooling a relatively hot saturated aqueous solution, allowing the compounds to crystallize from a saturated solution by seeding the solution, precipitating by the addition of a miscible solvent in which the compounds are less soluble, such as methanol, ethanol, acetone, etc., and the like.

In general the use of orthophosphorous acid in excess amounts, that is, amounts of orthophosphorus acid which are in excess of the stoichiometric molar ratio of reactants to form the desired compounds, of at least about 20% by weight is preferred and although there is, in general, no operative upper limit on the excess amount of orthophosphorous acid which can be used, for practical reasons it is rarely, if ever, advantageous to use an excess amount of more than 80% with excess amounts from about 30% to 50% being especially preferred. Therefore, in order to prepare a desired amino alkylenephosphonic acid compound by the process of the instant invention, the nitrogenous material and the organic carbonyl compound are preferably used in substantially stoichiometric molar ratios while the orthophosphorous acid is used in an amount which exceeds the stoichiometric molar ratio for preparing the desired compound by at least about 20% by weight and preferably from about 30% to about 50%.

A particularly valuable group of amino alkylenephosphonic acid compounds which are useful as sequestering agents and deflocculating agents in aqueous systems and whose yields as well as purity can be improved over their preparation by the normal reaction by following the teachings of the instant invention are the amino tri(lower alkylidenephosphonic acid) compounds having the following formula:

(2) 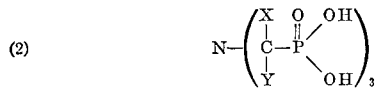

wherein X and Y are members selected from the group consisting of hydrogen and lower alkyl (1–4 carbon atoms).

The following example is presented to illustrate the invention with parts by weight being used in the example unless otherwise indicated.

EXAMPLE

Into a conventional jacketed, glass-lined mixing vessel fitted with a water condenser are charged 246 parts (3 moles of 71% concentration) of orthophosphorous acid, 53 parts (1 mole) of ammonium chloride, and 100 parts of water. The pH of the resulting mixture is about 0.5. This mixture is then heated to its reflux temperature, which under atmospheric pressure is about 108° C. Over a period of 30 minutes, while the mixture is being refluxed, a total of 95 parts (about 3 moles) of paraformaldehyde, are added slowly into the boiling mixture. After being refluxed for an additional 20 minutes, the mixture is cooled to ambient temperature and analyzed [by observing and measuring the nuclear magnetic resonance spectra (n.m.r.) of the product] to determine how much of the P—H bond (from HP(O)(OH)$_2$ of orthophosphorous acid) has been converted to the N—C—P bond of the product, amino tri(methylenephosphonic acid). By n.m.r. analysis, the product yield, based on the amount of phosphorus in the starting material, is about 95%. About 5% of the original orthophosphorous acid in the reaction mixture remains unreacted.

Upon cooling to about 20° C. and maintaining this temperature for a period of several days, the pure amino tri(methylenephosphonic acid) was crystallized. The crystal yield was about 137 g. (46% of theory). Nuclear magnetic resonance of the mother liquor indicated that the N—C—P bond corresponding to amino tri(methylenephosphonic acid) contained other similar products. The major impurity found was methyl-amino di(methylenephosphonic acid) which exhibits an n.m.r. spectra coinciding with the desired amino tri(methylenephosphonic acid) in a concentrated solution, but which is noticeable in the mother liquor.

When the foregoing reaction was carried out with an excess of about 30% orthophosphorous acid but otherwise using similar conditions, the yield of pure amino tri(methylenephosphonic acid) obtained by cooling to about 20° C. for about 16 hours and recovering the crystals was about 256 g. (86% of theory). The n.m.r. of the mother liquor showed very little of the impurity methyl amino di(methylenephosphonic acid) to be present. Quantitative analysis of the amount of amino tri (methylenephosphonic acid) in the mother liquor and from the recovered crystals indicated that the yield based on the other reactants, such as NH$_4$Cl in this case is 98.4%.

Compounds which can be prepared according to the improved process herein under substantially similar conditions as those described in the foregoing example when substantially stoichiometric molar ratios for the nitrogeneous material and the organic carbonyl compound and excess amounts of orthophosphorous acid as disclosed herein are used include such amino tri(lower alkylidenephosphonic acid) compounds (Formula 2) as the following:

amino tri(ethylidenephosphonic acid)
amino tri(propylidenephosphonic acid)
amino tri(butylidenephosphonic acid)
amino tri(amylidenephosphonic acid)

as well as other amino alkylenephosphonic acids which include the following:

n-tetradecyl amino di(methylenephosphonic acid)
n-decyl amino di(ethylidenephosphonic acid)
amino mono-acetic acid, di(methylenephosphonic acid)
amino diacetic acid, mono-methylenephosphonic acid
cyclohexylamino di(benzylidenephosphonic acid)
ethylene diamine tetramethylenephosphonic acid
amino-2,3-propenyl diisopropyl tri(methylenephosphonic acid)
di-n-propyl amino (nonylidenephosphonic acid)
ethylamino di(methylenephosphonic acid)
di-n-propyl amino (methylenephosphonic acid)
octadecyl amino di(methylenephosphonic acid)
didodecyl amino (methylenephosphonic acid)
amino tri(hendecylidenephosphonic acid)
isobutyl amino di(propylidenephosphonic acid)
diethylamino-2-hexylidenephosphonic acid
tridecyl amino di(2-chloroethylidene-1-furyl phosphonic acid)

What is claimed is:

1. In the method for preparing amino alkylenephosphonic acids wherein a nitrogenous material selected from the group consisting of ammonia, primary amines, and secondary amines, an organic carbonyl compound selected from the group consisting of aldehydes and ketones, and orthophosphorous acid are reacted together in any order to form an amino alkylene-phosphonic acid, the improvement comprising carrying out said reaction in the presence of substantially stoichiometric amounts of said nitrogenous material and said carbonyl compound and amounts of orthophosphorous acid which are in excess of stoichiometry by greater than about 20% by weight whereby the yield of said amino alkylenephosphonic acid is improved, said reaction being carried out in the presence of a halide catalyst.

2. The method of claim 1, wherein said amino alkylenephosphonic acid is recovered from the excess orthophosphorous solution in the solid form in improved purity.

3. In the method for preparing amino alkylenephosphonic acids wherein a nitrogenous material selected from the group consisting of ammonia, primary amines, and secondary amines, an organic carbonyl compound selected from the group consisting of aldehydes and ketones, and orthophosphorous acid are reacted together in any order in an acidic aqueous solution having a pH below about 2 with the aqueous medium containing from about 30% to about 60% water by weight using temperatures from about 85° C. to reflux temperatures to form an amino alkylenephosphonic acid, the improvement comprising carrying out said reaction in the presence of substantially stoichiometric amounts of said nitrogenous material and said carbonyl compound and amounts of orthophosphorous acid which are in excess of stoichiometry by greater than about 20% by weight whereby the yield of said amino alkylenephosphonic acid is improved, said reaction being carried out in the presence of a halide catalyst.

4. The method of claim 3, wherein said amino alkylenephosphonic acid is recovered from the excess orthophosphorous acid solution in the solid form in improved purity.

5. In the method for preparing amino alkylenephosphonic acids wherein a salt of orthophosphorous acid selected from the group consisting of ammonium, primary amines and secondary amines and an organic carbonyl compound selected from the group consisting of aldehydes and ketones are reacted together in an acidic aqueous solution having a pH below about 2 with the aqueous medium containing from about 30% to about 60% water by weight using temperatures from about 85° C. to reflux temperatures to form an amino alkylenephosphonic acid, the improvement comprising carrying out said reaction in the presence of substantially stoichiometric amounts of said nitrogenous material and said carbonyl compound and amounts of orthophosphorous acid which are in excess of stoichiometry by greater than about 20% by weight whereby the yield of said amino alkylenephosphonic acid is improved, said reaction being carried out in the presence of a halide catalyst.

6. In the method for preparing amino tri(lower alkylidene phosphonic acids) wherein ammonia, or organic carbonyl compound selected from the group consisting of aldehydes and ketones and orthophosphorous acid are reacted together in any order in an acidic aqueous solution having a pH below about 2 with the aqueous medium containing from about 30% to about 660% water by weight using temperatures from about 85° C. to reflux temperatures to form an amino tri(lower alkylidene phosphonic acid), the improvement comprising carrying out said reaction in the presence of substantially stoichiometric amounts of said nitrogenous material and said carbonyl compound and amounts of orthophosphorous acid which are in excess of stoichiometry by greater than about 20% by weight whereby the yield of said amino tri(lower alkylidene phosphonic acid) is improved, said reaction being carried out in the presence of a halide catalyst.

7. The method of claim 6, wherein said amino tri (lower alkylidene phosphonic acid) is recovered from the excess orthophosphorous acid solution in the solid form in improved purity.

8. In the method for preparing amino tri(lower alkylidene phosphonic acids) wherein ammonia, an aldehyde and orthophosphorous acid are reacted together in any order in an acidic aqueous solution having a pH below about 2 with the aqueous medium containing from about 30% to about 60% water by weight using temperatures from about 85° C. to reflux temperatures to form an amino tri(lower alkylidene phosphonic acid), the improvement comprising carrying out said reaction in the presence of substantially stoichiometric amounts of said ammonia and said aldehyde and amounts of orthophosphorous acid which are in excess of stoichiometry by greater than about 20% by weight whereby the yield of said amino tri(lower alkylidene phosphonic acid) is improved, said reaction being carried out in the presence of a halide catalyst.

9. The method of claim 8 wherein said amino tri(lower alkylidene phosphonic acid) is recovered from the excess orthophosphorous acid solution in the solid form in improved purity.

10. In the method for preparing amino tri(methylene phosphonic acid) wherein ammonia, formaldehyde and orthophosphorous acid are reacted in an acidic aqueous solution having a pH below about 2 with the aqueous medium containing from about 30% to about 60% water by weight using temperatures from about 85° C. to reflux temperatures to form said phosphonic acid, the improvement comprising carrying out said reaction in the presence of substantially stoichiometric amounts of said ammonia and said formaldehyde and amounts of orthophosphorous acid which are in excess of stoichiometry by greater than about 20% by weight whereby the yield of said phosphonic acid is improved, said reaction being carried out in the presence of a halide catalyst.

11. In the method for preparing amino tri(methylene phosphonic acid) wherein ammonia, formaldehyde and orthophosphorous acid are reacted in an acidic aqueous solution having a pH below about 2 with the aqueous medium containing from about 30% to about 60% water by weight using temperatures from about 85° C. to reflux temperatures to form said phosphonic acid, the improvement comprising carrying out said reaction in the presence of substantially stoichiometric amounts of said ammonia and said formaldehyde and amounts of orthophosphorous acid which are in excess of stoichiometry by greater than about 20% by weight and crystallizing said phosphonic acid from the excess orthophosphorous acid solution in improved form, said reaction being carried out in the presence of a chloride catalyst which is utilized in the amount of from about .3% to about 20% by weight.

12. The method of claim 10 wherein said excess amounts of orthophosphorous acid are from about 30% to about 50%.

References Cited

UNITED STATES PATENTS

| | | | |
|---|---|---|---|
| 3,257,479 | 6/1966 | Irani et al. | 260—502.5 |
| 3,288,846 | 11/1966 | Irani et al. | 260—502.5 |

FOREIGN PATENTS

| | | | |
|---|---|---|---|
| 1,342,412 | 9/1963 | France | 260—502.5 |

OTHER REFERENCES

Werner, "J. Chem. Soc.," 111 (1917) pages 844 to 853, QD1C6.

BERNARD HELFIN, Primary Examiner

J. E. EVANS, Assistant Examiner

U.S. Cl. X.R.

260—347.7